United States Patent
Lam

(10) Patent No.: US 10,126,471 B2
(45) Date of Patent: Nov. 13, 2018

(54) PROTECTIVE MATERIAL AND METHOD FOR REFLECTING AND DISPERSING INCIDENT ENERGY

(71) Applicant: The Boeing Company, Chicago, IL (US)

(72) Inventor: Tai A. Lam, Renton, WA (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 15/239,925

(22) Filed: Aug. 18, 2016

(65) Prior Publication Data
US 2018/0052261 A1 Feb. 22, 2018

(51) Int. Cl.
| | | |
|---|---|---|
| *G02B 5/08* | (2006.01) | |
| *G02B 1/00* | (2006.01) | |
| *G02B 5/02* | (2006.01) | |
| *G02B 5/28* | (2006.01) | |

(52) U.S. Cl.
CPC ........... *G02B 5/0858* (2013.01); *G02B 1/002* (2013.01); *G02B 1/005* (2013.01); *G02B 1/007* (2013.01); *G02B 5/0284* (2013.01); *G02B 5/0294* (2013.01); *G02B 5/085* (2013.01); *G02B 5/0816* (2013.01); *G02B 5/0825* (2013.01); *G02B 5/282* (2013.01); *G02B 5/288* (2013.01)

(58) Field of Classification Search
CPC ...... G02B 5/0858; G02B 1/005; G02B 1/007; G02B 5/0825
USPC ........................................................ 359/585
See application file for complete search history.

(56) References Cited

U.S. PATENT DOCUMENTS

| | | | |
|---|---|---|---|
| 4,281,894 A | 8/1981 | Guha | |
| 5,907,436 A | 5/1999 | Perry et al. | |
| 7,903,338 B1 | 3/2011 | Wach | |
| 2003/0161997 A1* | 8/2003 | Moran | B32B 3/30 428/172 |
| 2015/0299470 A1* | 10/2015 | Ngo | C09D 5/006 345/173 |
| 2016/0172632 A1* | 6/2016 | Kwon | G02B 5/0247 257/40 |
| 2016/0194490 A1* | 7/2016 | Dai | C08F 212/08 523/201 |

OTHER PUBLICATIONS

Wikipedia, the free encyclopedia. "Total Internal Reflection". Https://en.wikipedia.org/wiki.total_internal_reflection.
Wikipedia, the free encyclopedia. "Transfer-matrix Method". Https://en.wikipedia.org/wiki.transfer-matrix_method.
(Continued)

*Primary Examiner* — Bumsuk Won
*Assistant Examiner* — Wen Huang
(74) *Attorney, Agent, or Firm* — Perman & Green, LLP

(57) ABSTRACT

A protective material that includes a dielectric mirror having at least one layer, each layer of the dielectric mirror being configured to reflect at least a portion of incident energy of a predetermined wavelength; and a photonic, crystal array of periodic structures disposed within the dielectric mirror, the photonic crystal array of periodic structures being configured to disperse non-reflected incident energy of the predetermined wavelength transmitted through the dielectric mirror across the photonic crystal array of periodic structures in a direction parallel to a plane of the dielectric mirror.

20 Claims, 18 Drawing Sheets

(56) References Cited

OTHER PUBLICATIONS

Wikipedia, the free encyclopedia. "Dielectric Mirror". Https://en.wikipedia.org/wiki.dielectric_mirror.
Jinlong He et. al "Slow light in a dielectric waveguide with negative-refractive-index photonic crystal cladding". Optics Express Jul. 21, 2008, pp. 11077-11082. Retrived on Jan. 11, 2018 https://www.osapublishing.org/oe/fulltext.cfm?uri=oe-16-15-11077&id=167311.
Extended European Search Report, European Application No. 17179868, dated Jan. 19, 2018.

\* cited by examiner

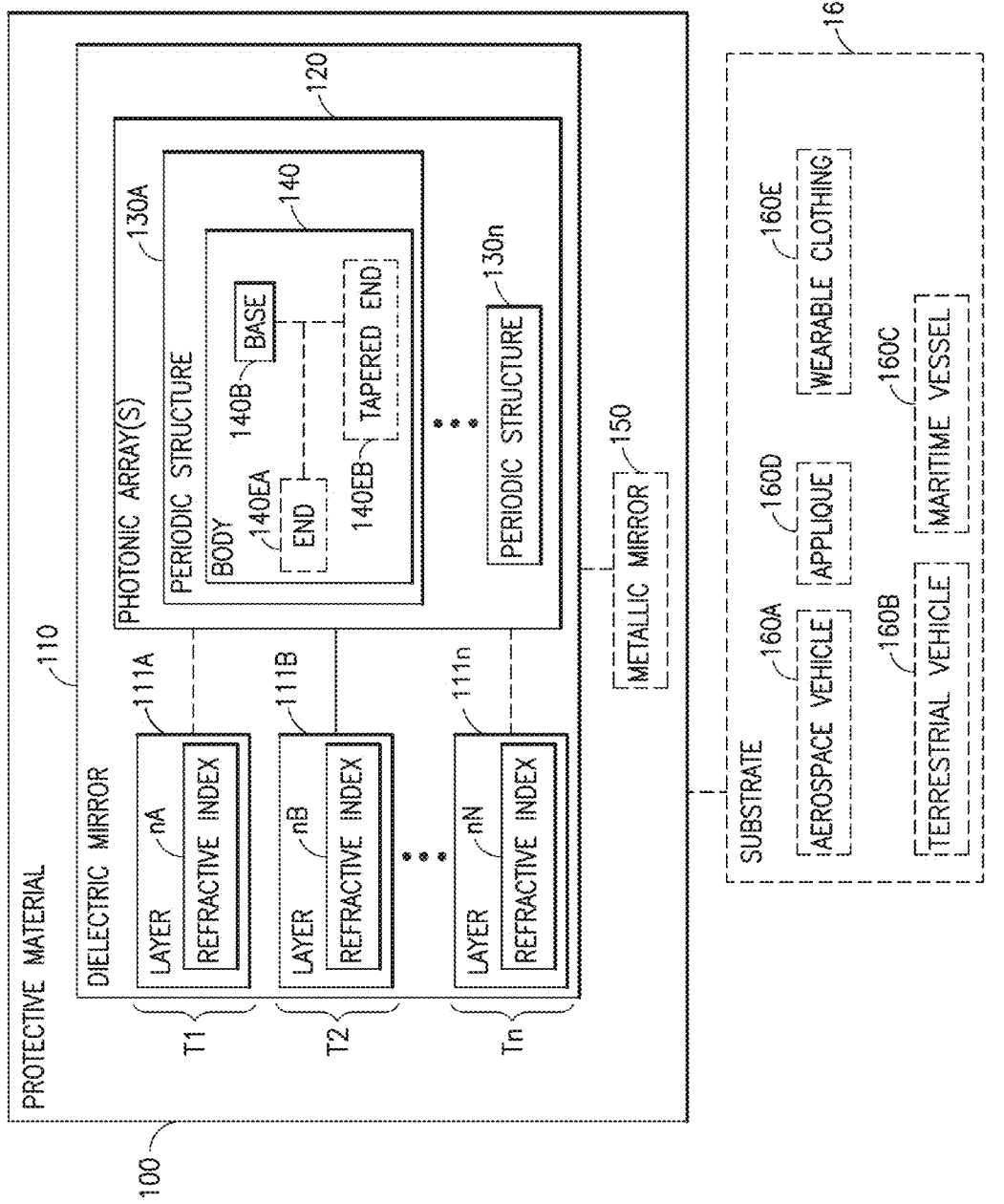

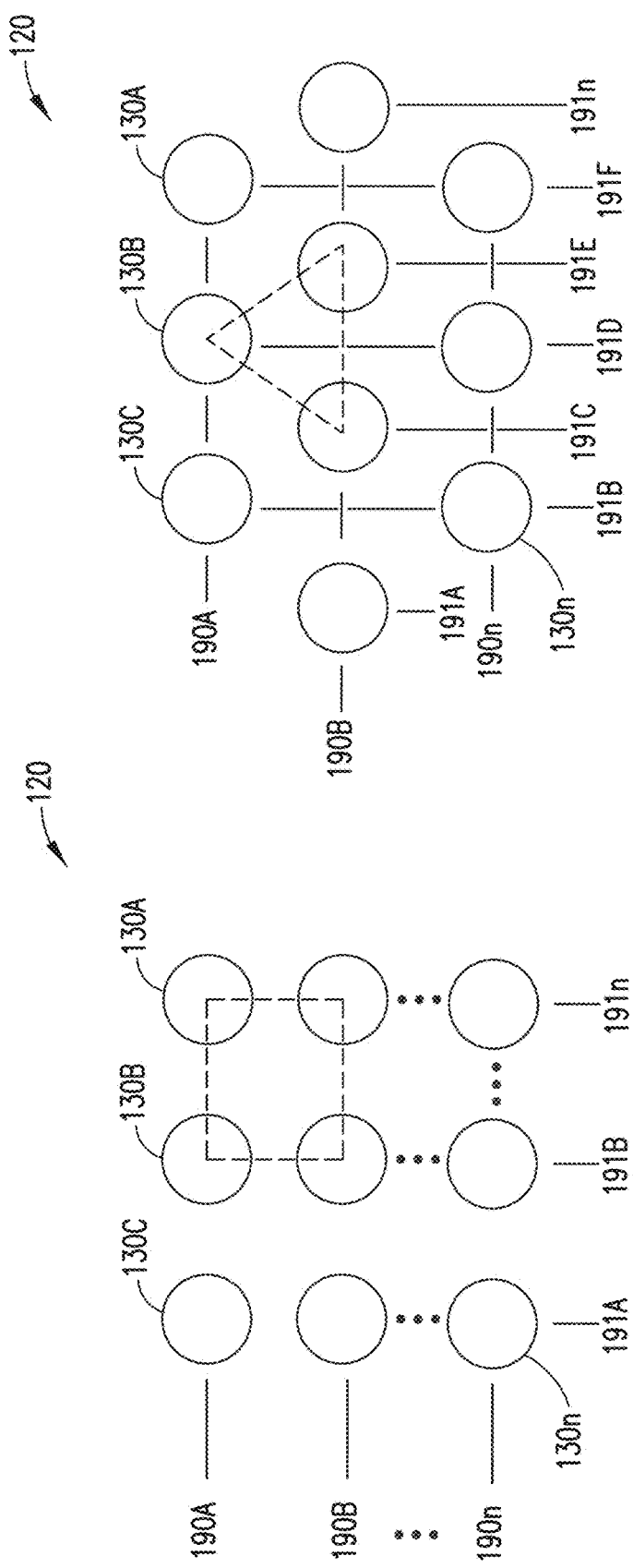

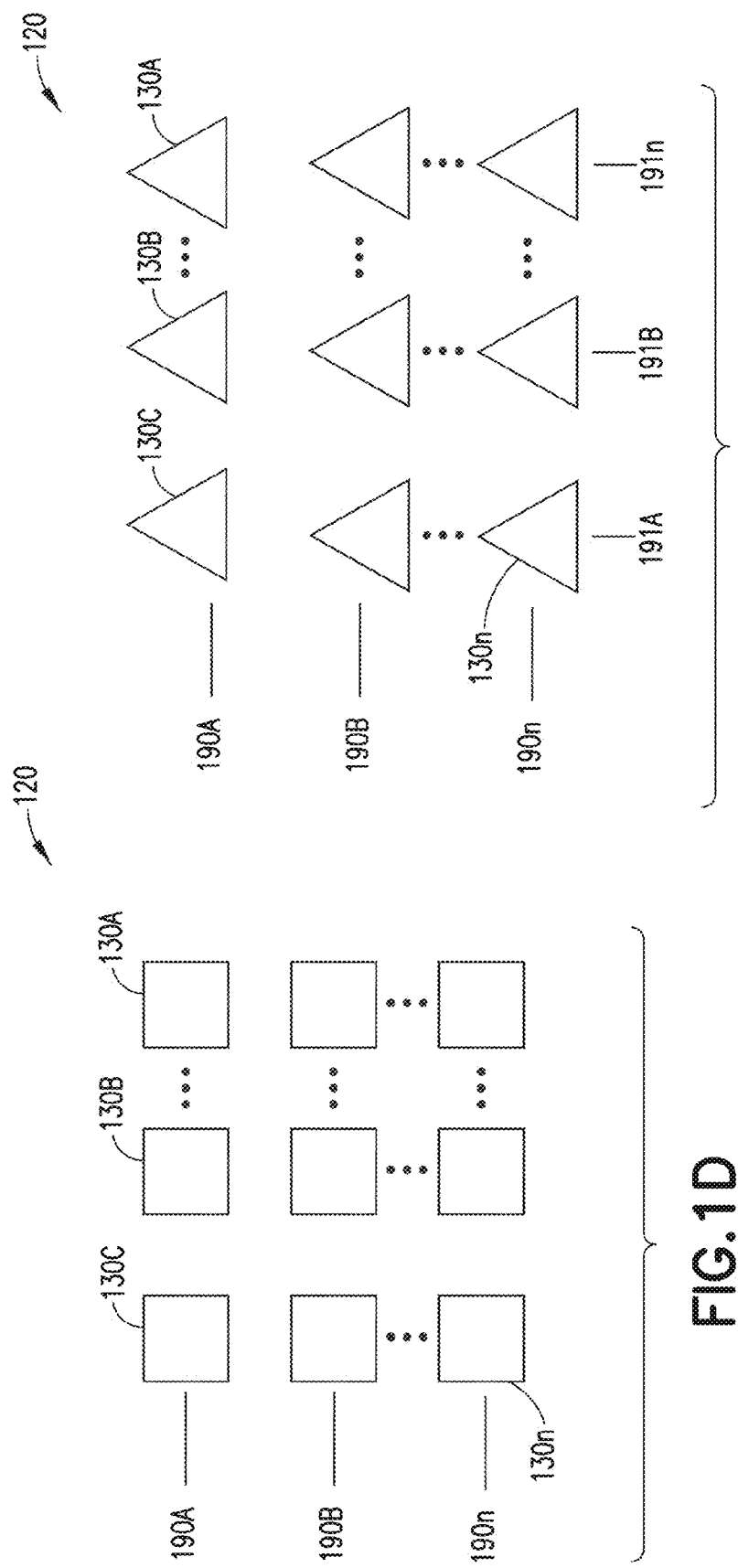

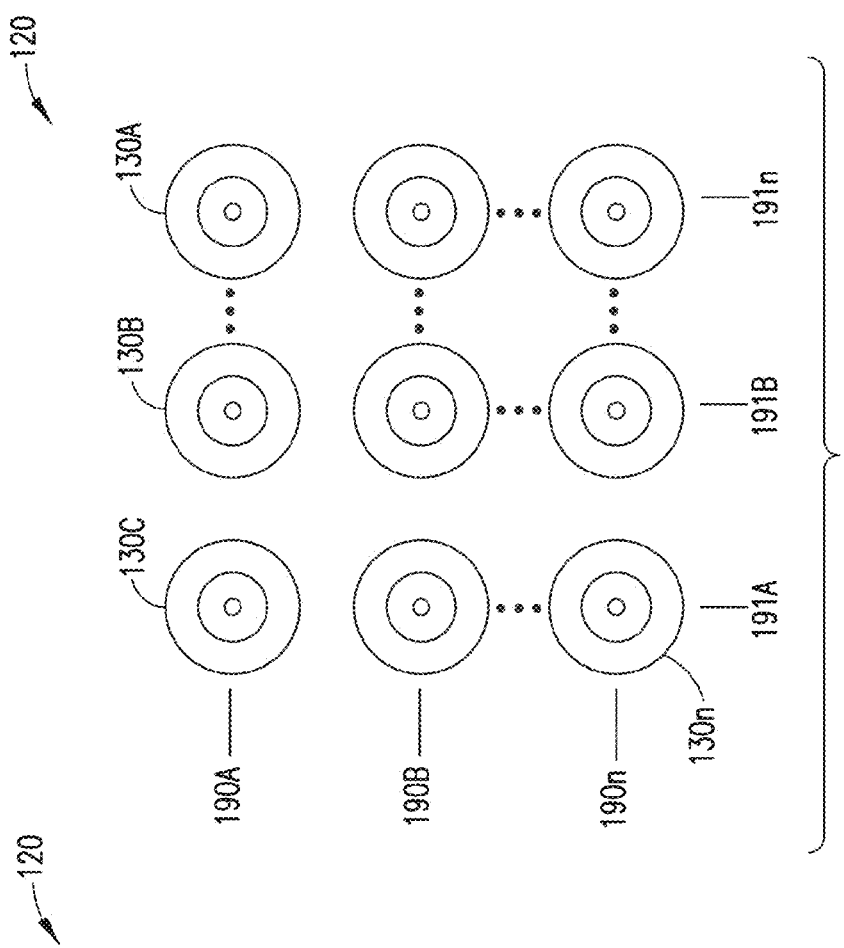
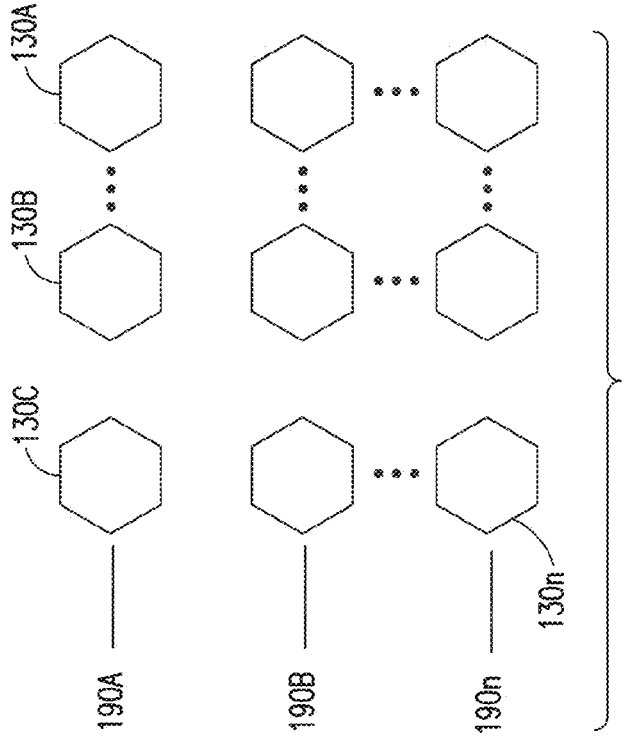

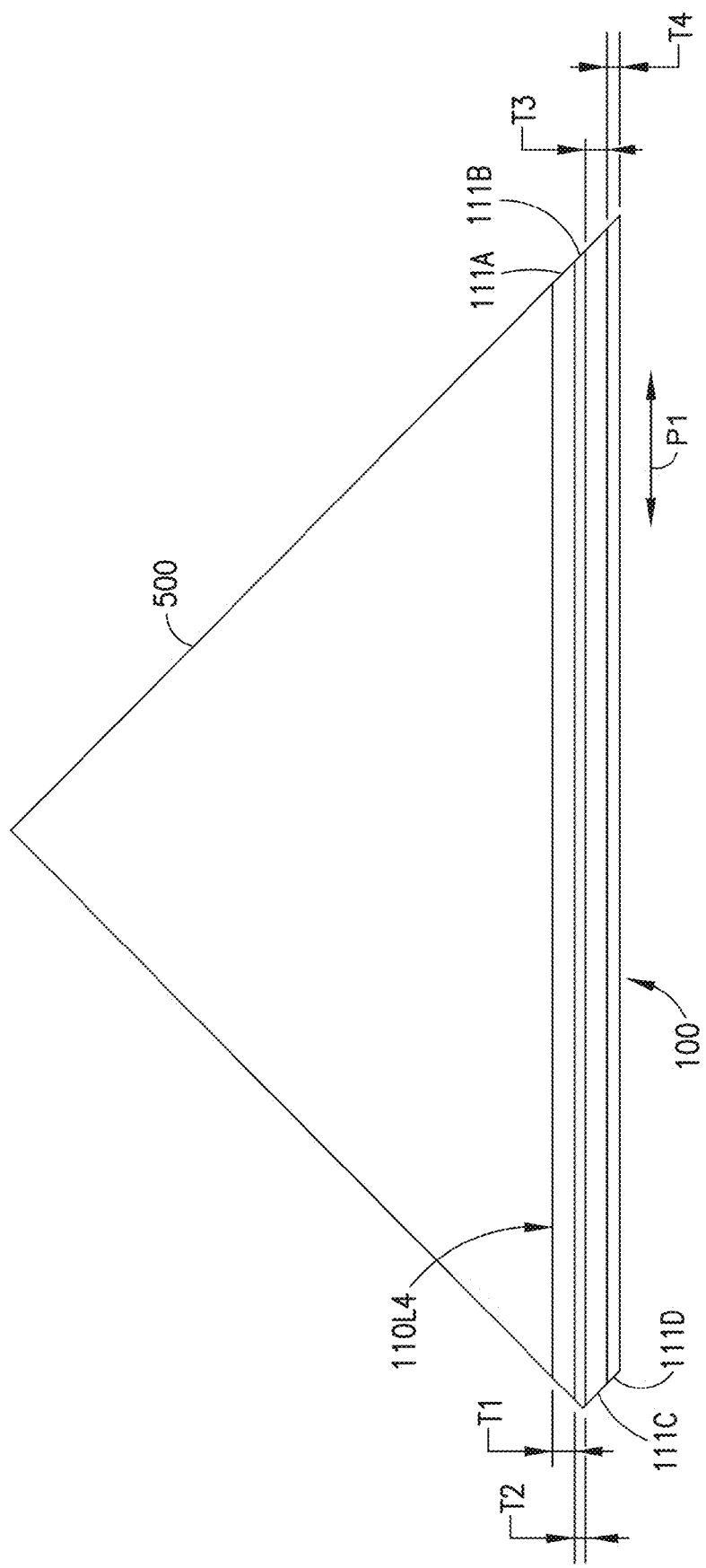

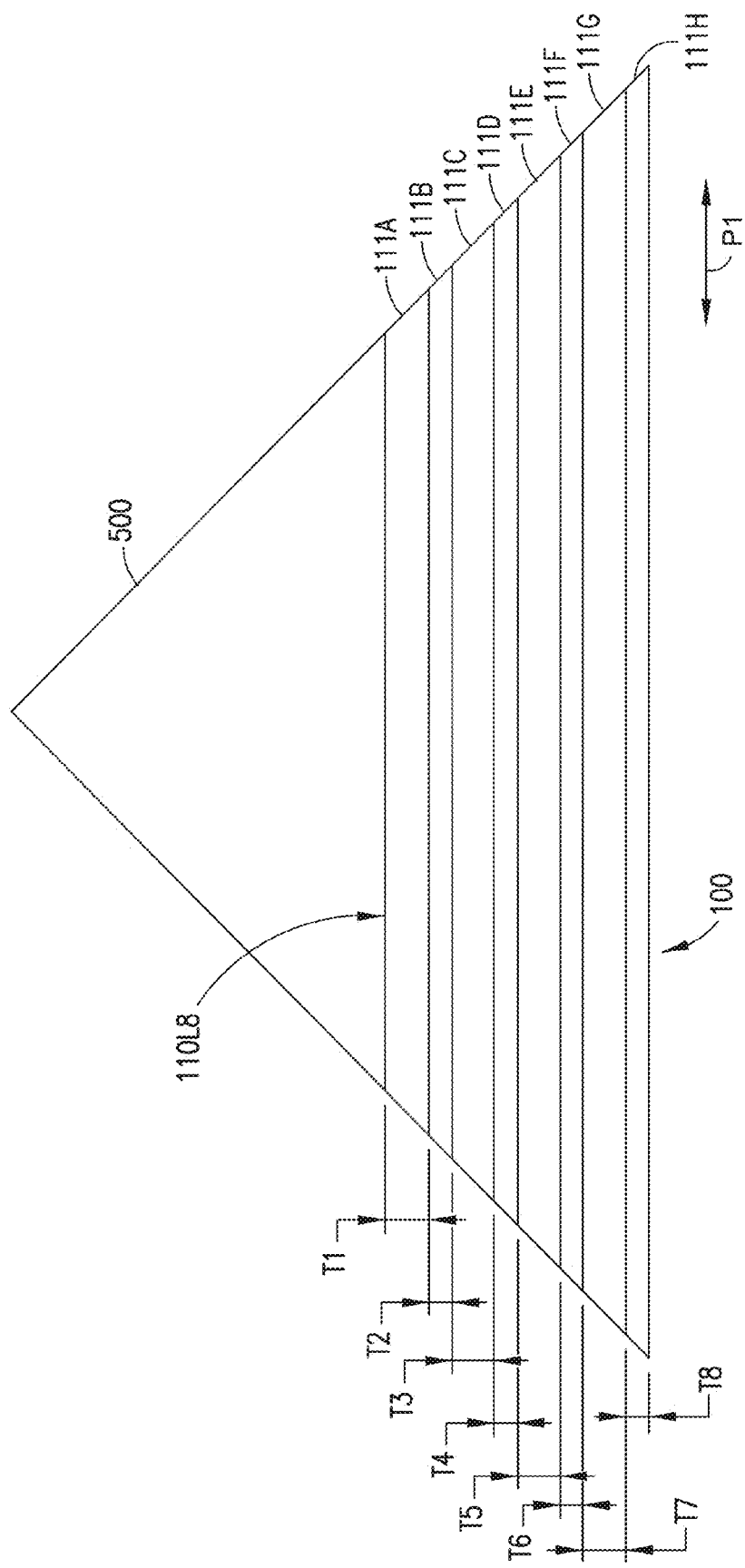

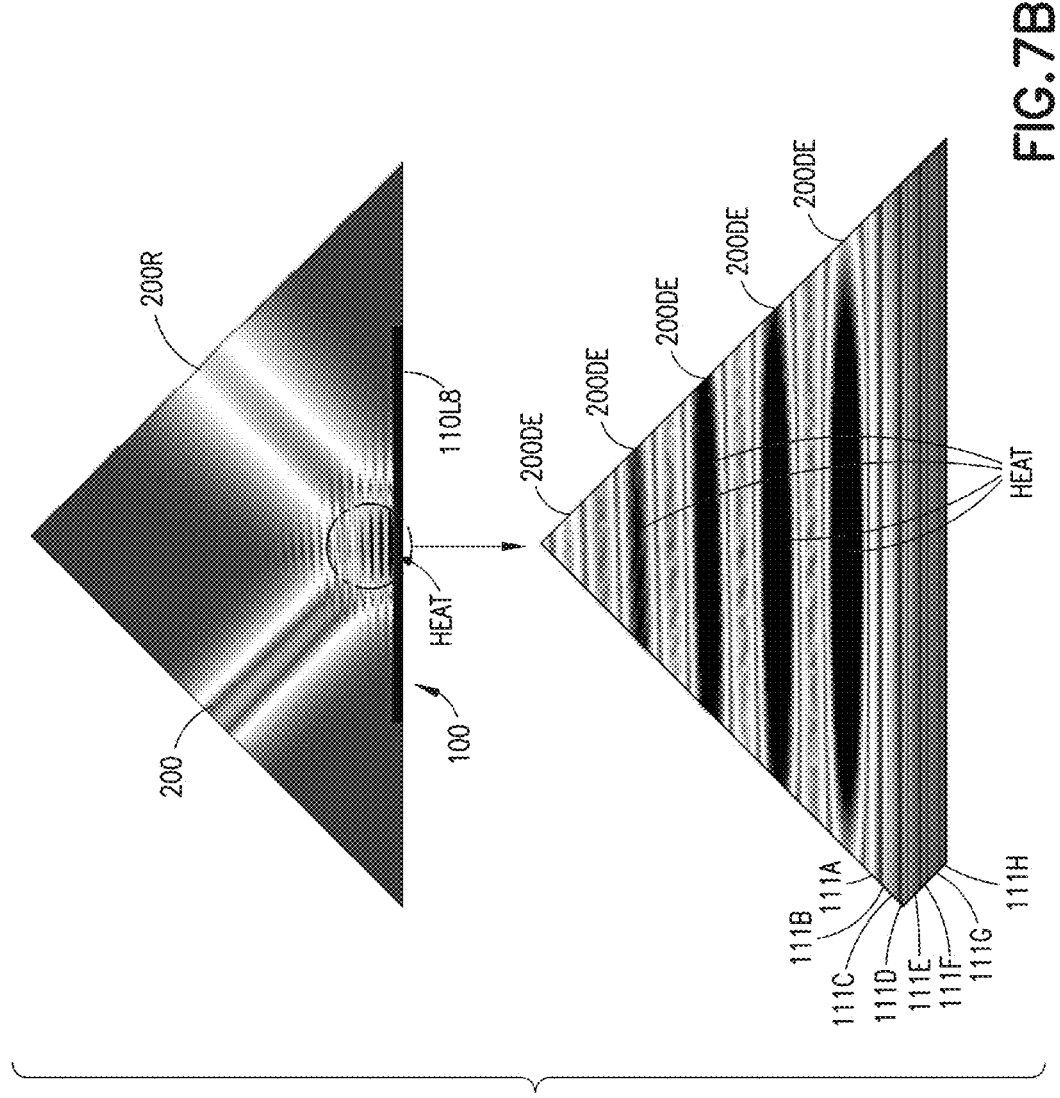

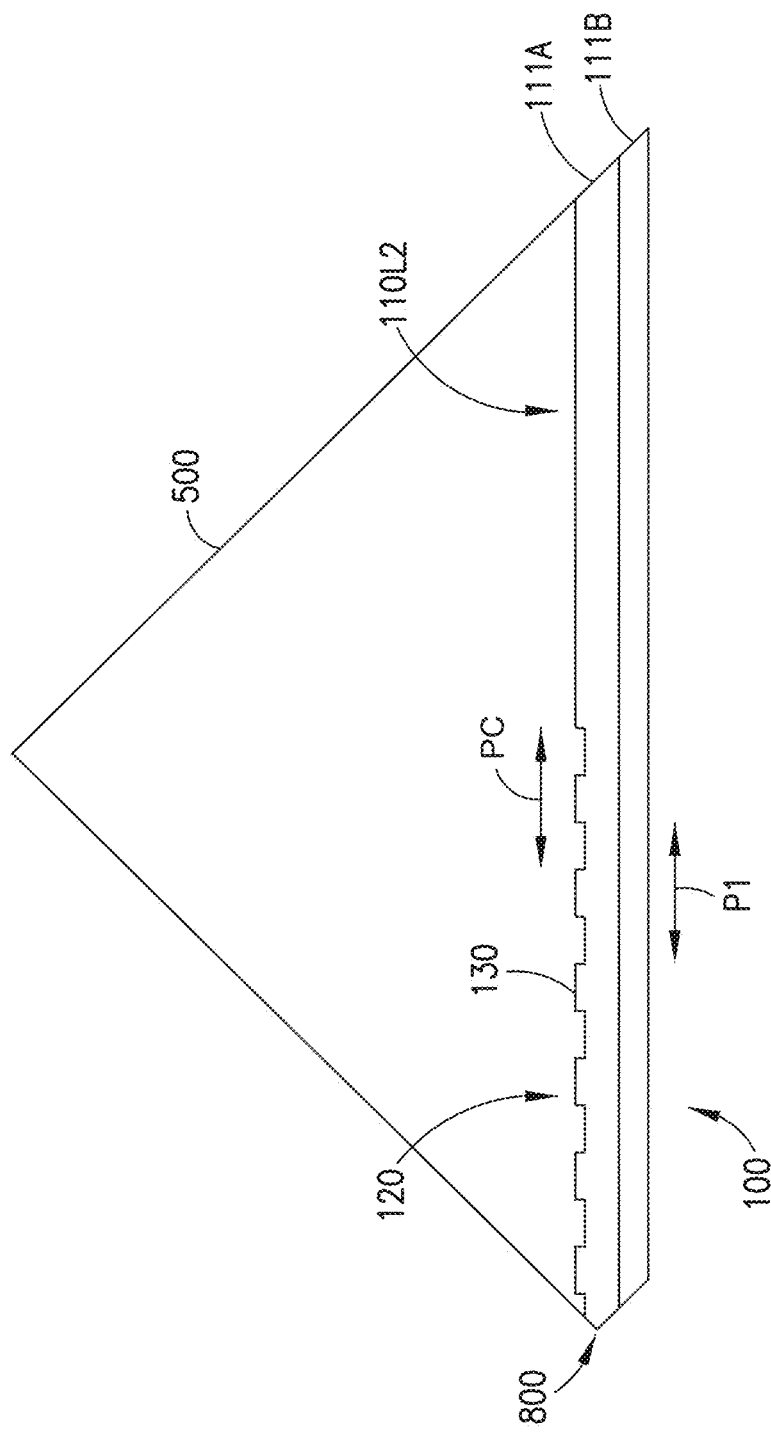

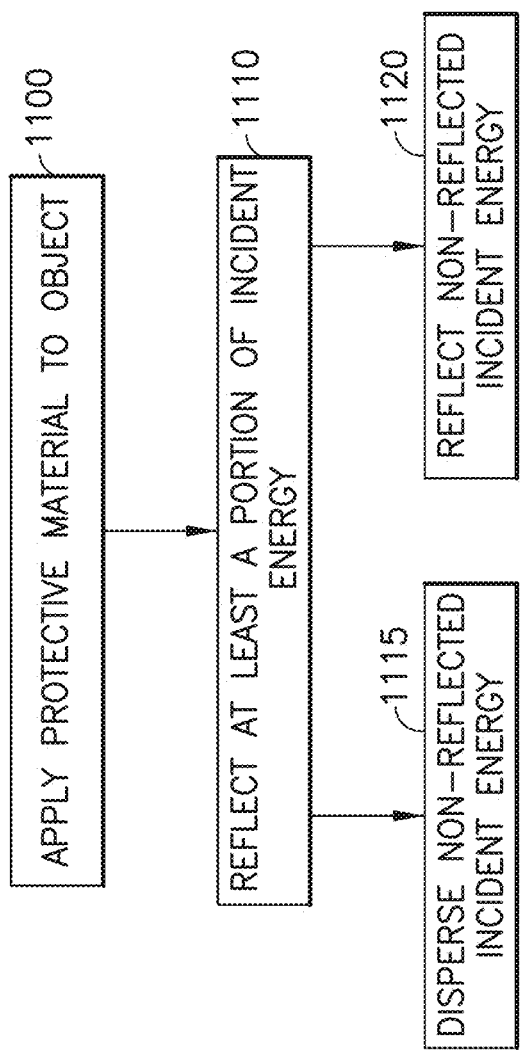

PROTECTIVE MATERIAL AND METHOD FOR REFLECTING AND DISPERSING INCIDENT ENERGY

BACKGROUND

Conventionally, protection of an object against incident energy, such as high energy lasers, is achieved with high temperature ceramic coatings. However, these ceramic coatings may add to the weight of the object. In one aspect, the use of high temperature ceramic coatings on objects such as aerospace vehicles may be prohibitive due to weight and/or performance requirements for the aerospace vehicle. Further, high temperature ceramic coatings pose integration challenges when used on, for example, general surface materials and conformal geometries due to the brittle nature of the ceramic composites used in the high temperature ceramic coatings.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a protective material that includes a dielectric mirror having at least one layer, each layer of the dielectric mirror being configured to reflect at least a portion of incident energy of a predetermined wavelength; and a photonic crystal array of periodic structures disposed within the dielectric mirror, the photonic crystal array of periodic structures being configured to disperse non-reflected incident energy of the predetermined wavelength transmitted through the dielectric mirror across the photonic crystal array of periodic structures in a direction parallel to a plane of the dielectric mirror.

Another example of the subject matter according to the present disclosure relates to a protective material that includes a metallic mirror a dielectric Mirror formed on the metallic mirror and having at least one layer, each layer of the dielectric mirror being configured to reflect at least a portion of incident energy of a predetermined wavelength, and a photonic crystal array of periodic structures disposed within the dielectric mirror, the photonic crystal array of periodic structures being configured to disperse non-reflected incident energy of the predetermined wavelength transmitted through the dielectric mirror across the photonic crystal array of periodic structures in a direction parallel to a plane of the dielectric mirror.

Still another example of the subject matter according to the present disclosure relates to a method for reflecting and dispersing incident energy of a predetermined wavelength. The method includes reflecting at least a portion of incident energy of a predetermined wavelength with a dielectric mirror having at least one layer, each layer of the dielectric mirror reflecting a portion of the incident energy of the predetermined wavelength, and dispersing non-reflected incident energy of the predetermined wavelength transmitted through the dielectric mirror, with a photonic crystal array of periodic structures disposed within the dielectric mirror, across the photonic crystal array of periodic structures in a direction parallel to a plane of the dielectric mirror.

BRIEF DESCRIPTION OF THE DRAWINGS

Figure 2:
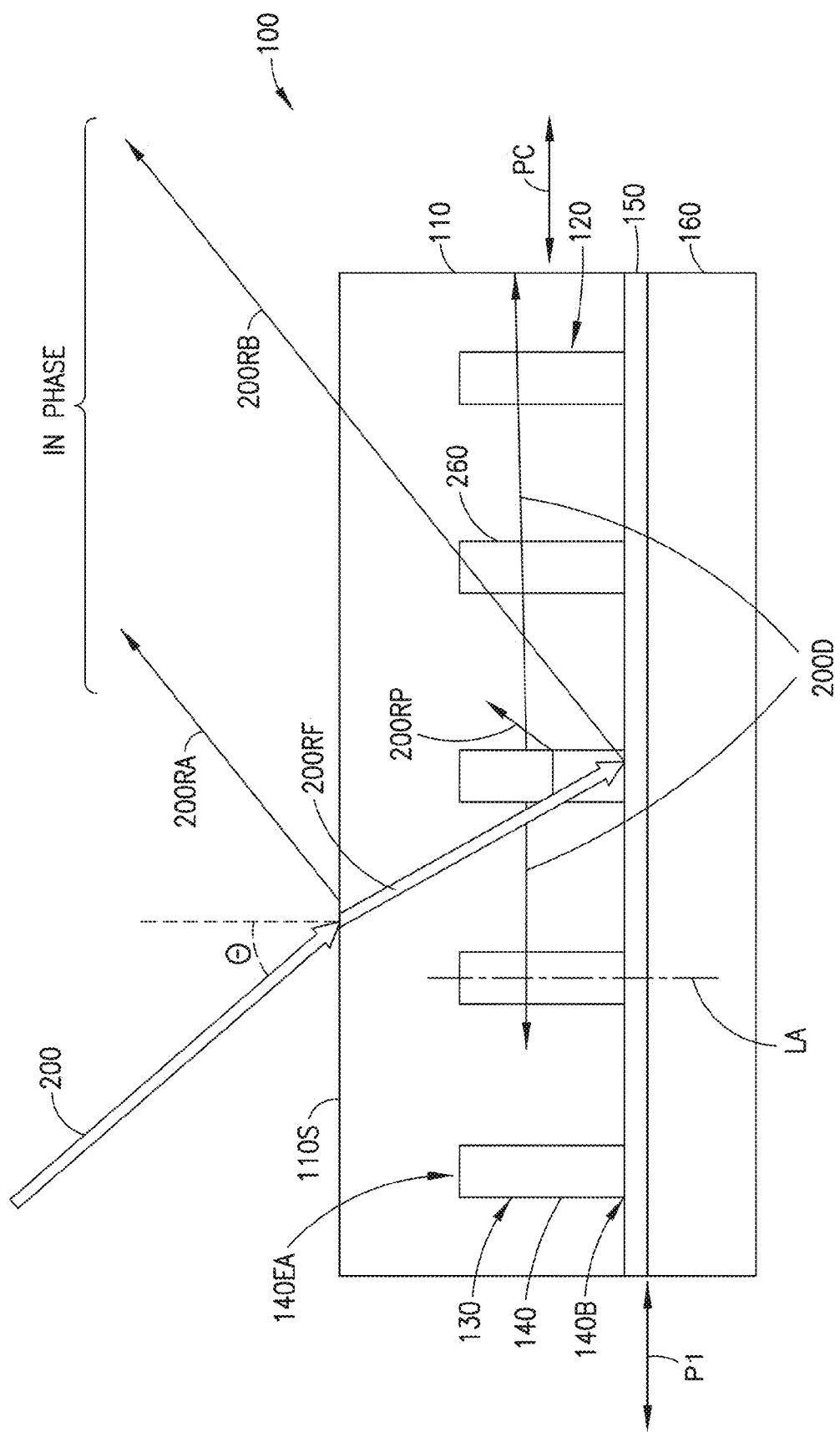
Figure 3:
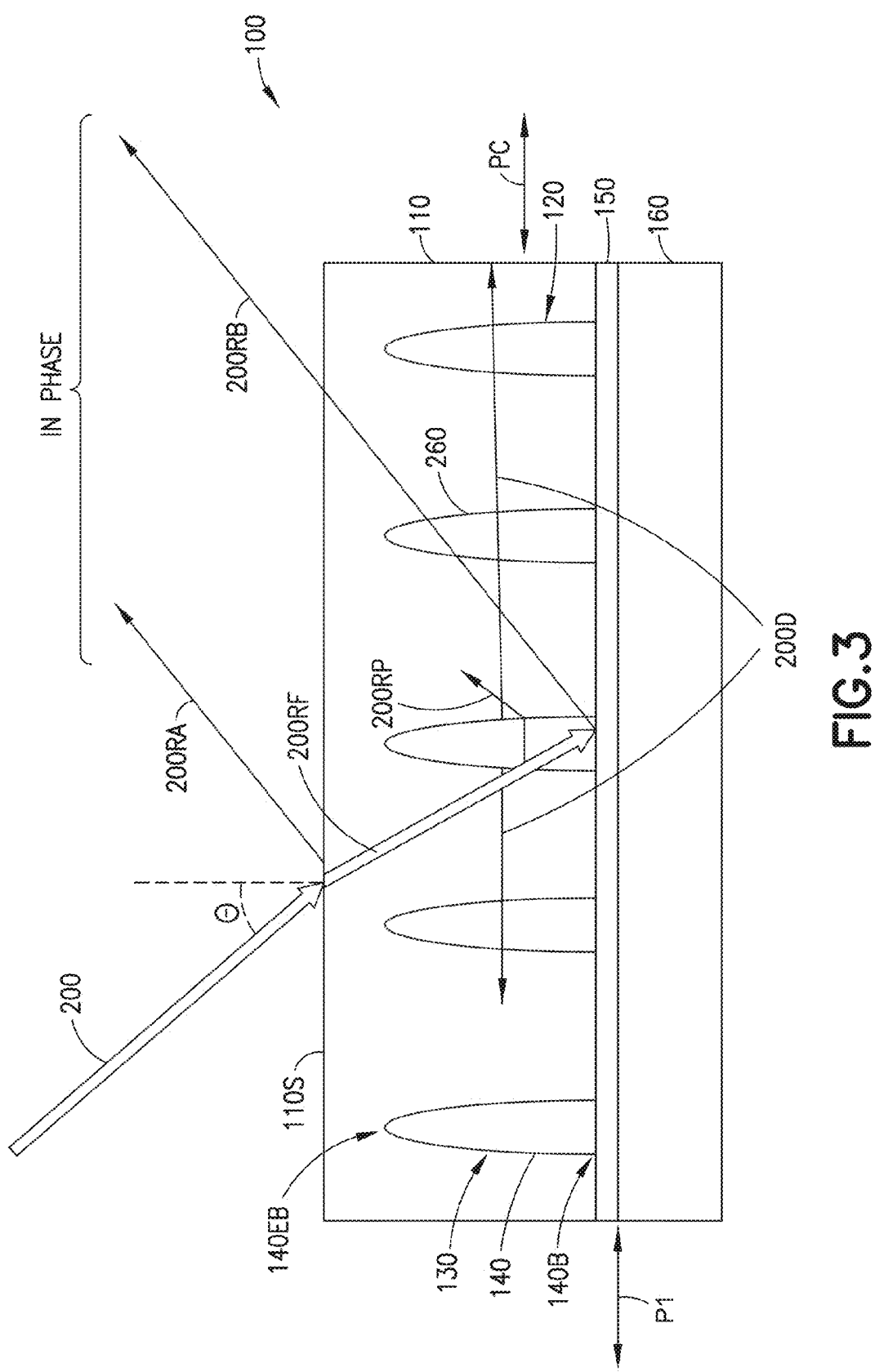
Figure 5B:
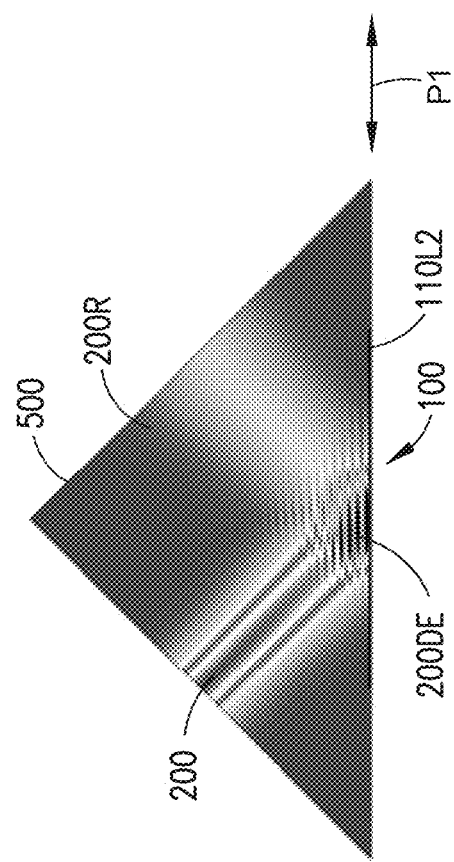
Figure 4:
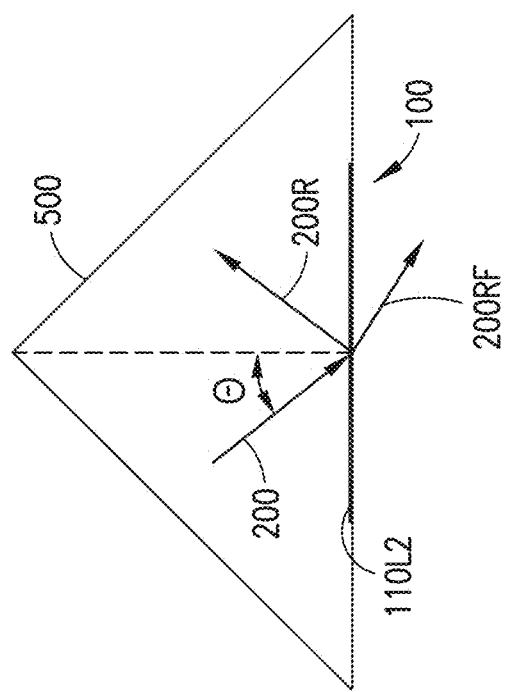
Figure 5A:
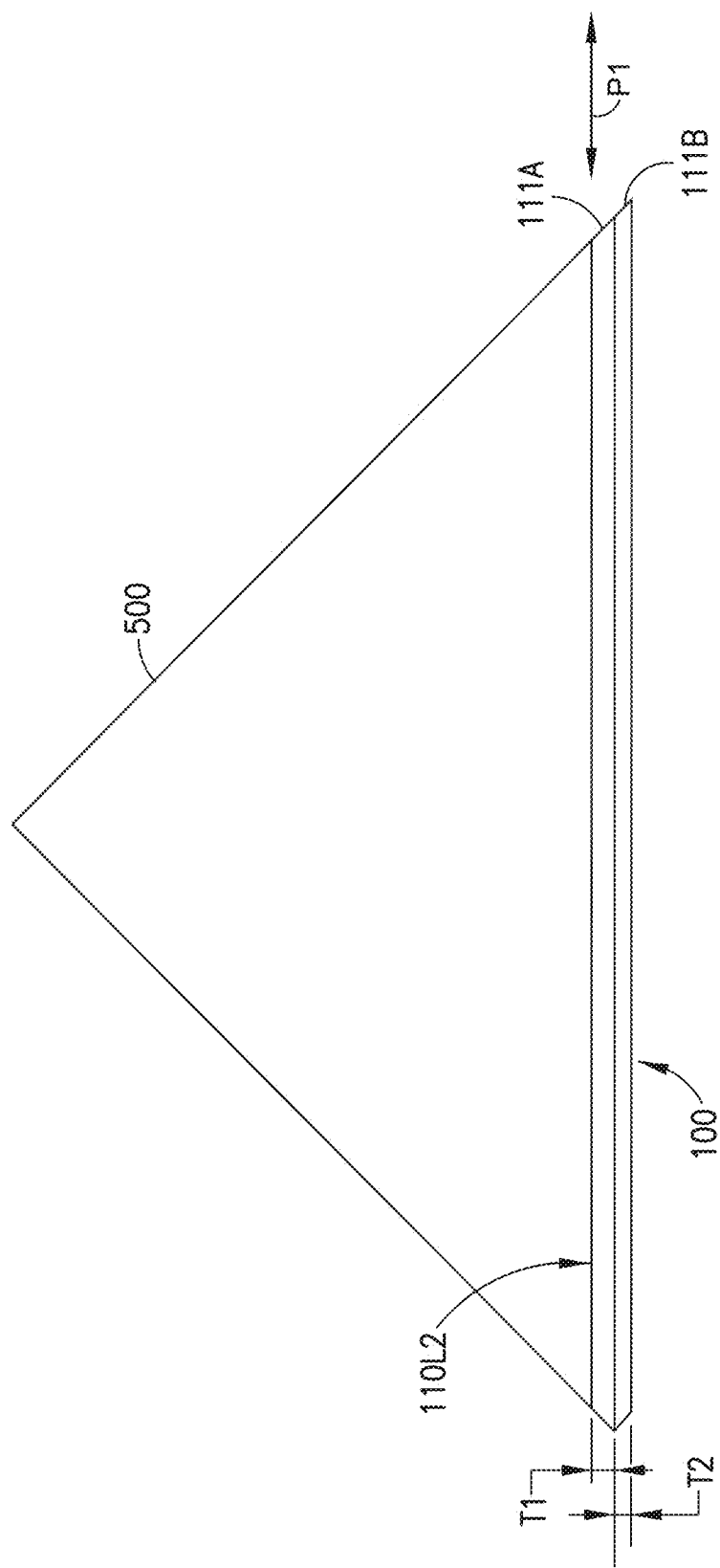
Figure 6B:
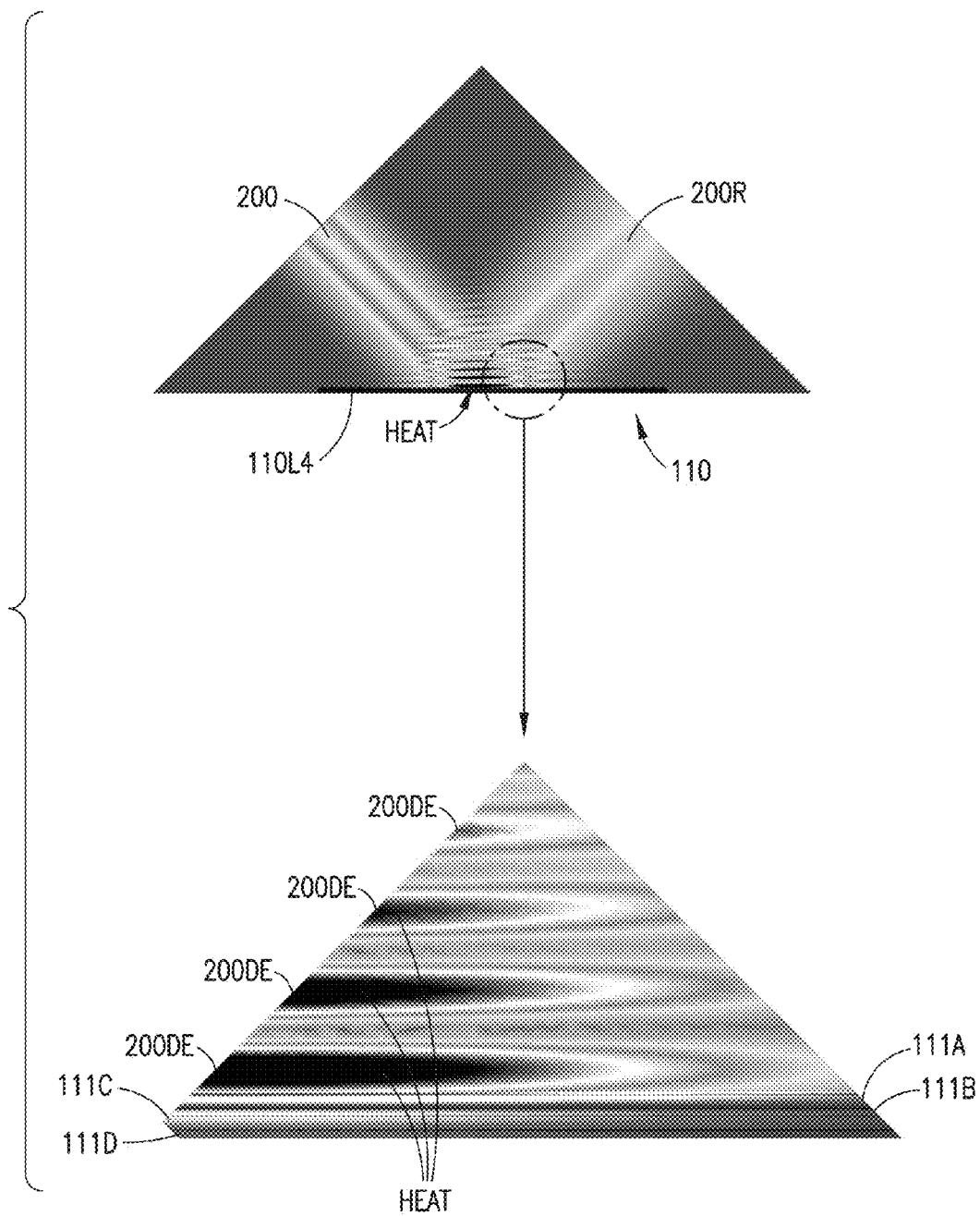
Figure 8B:
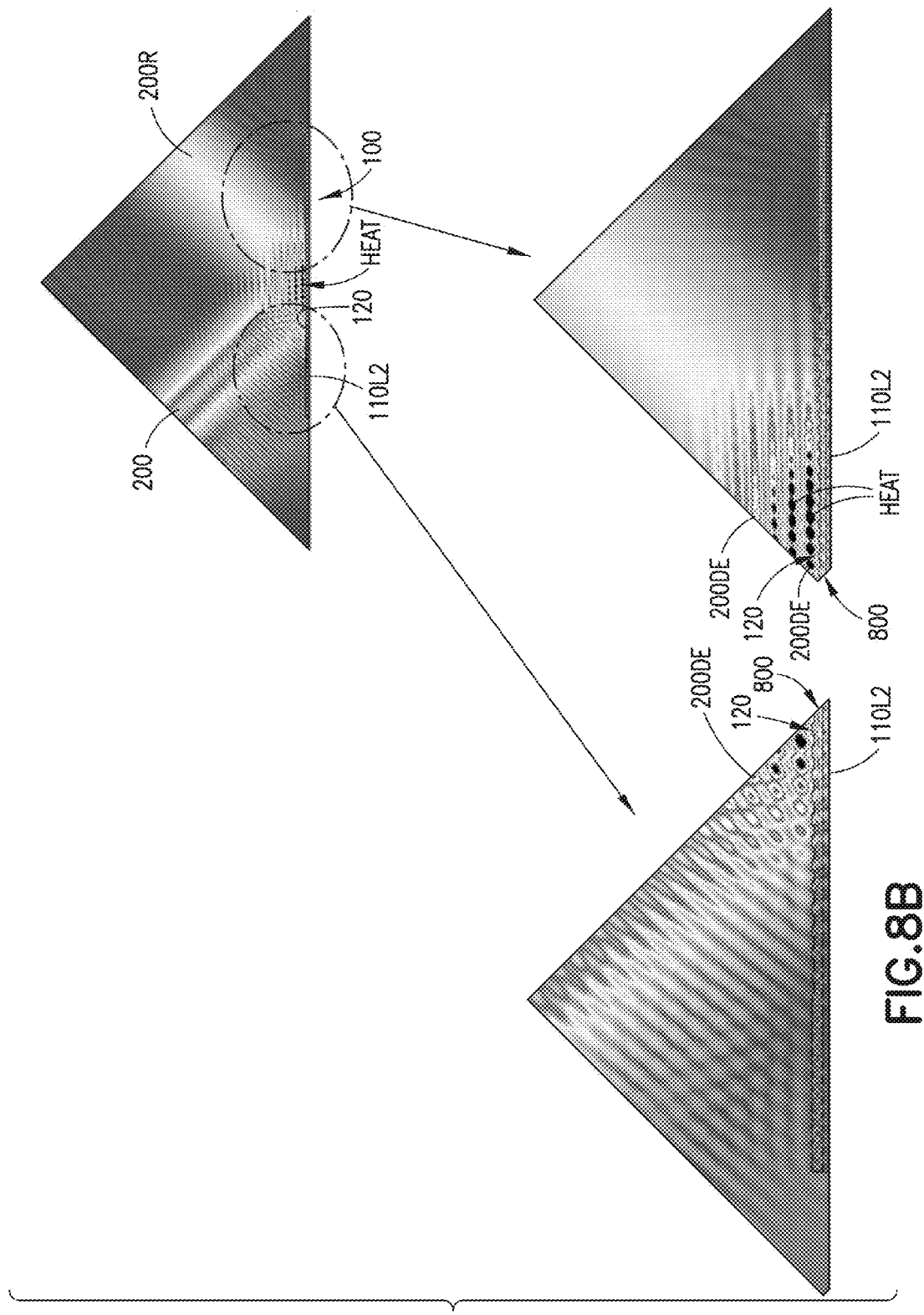
Figure 9A:
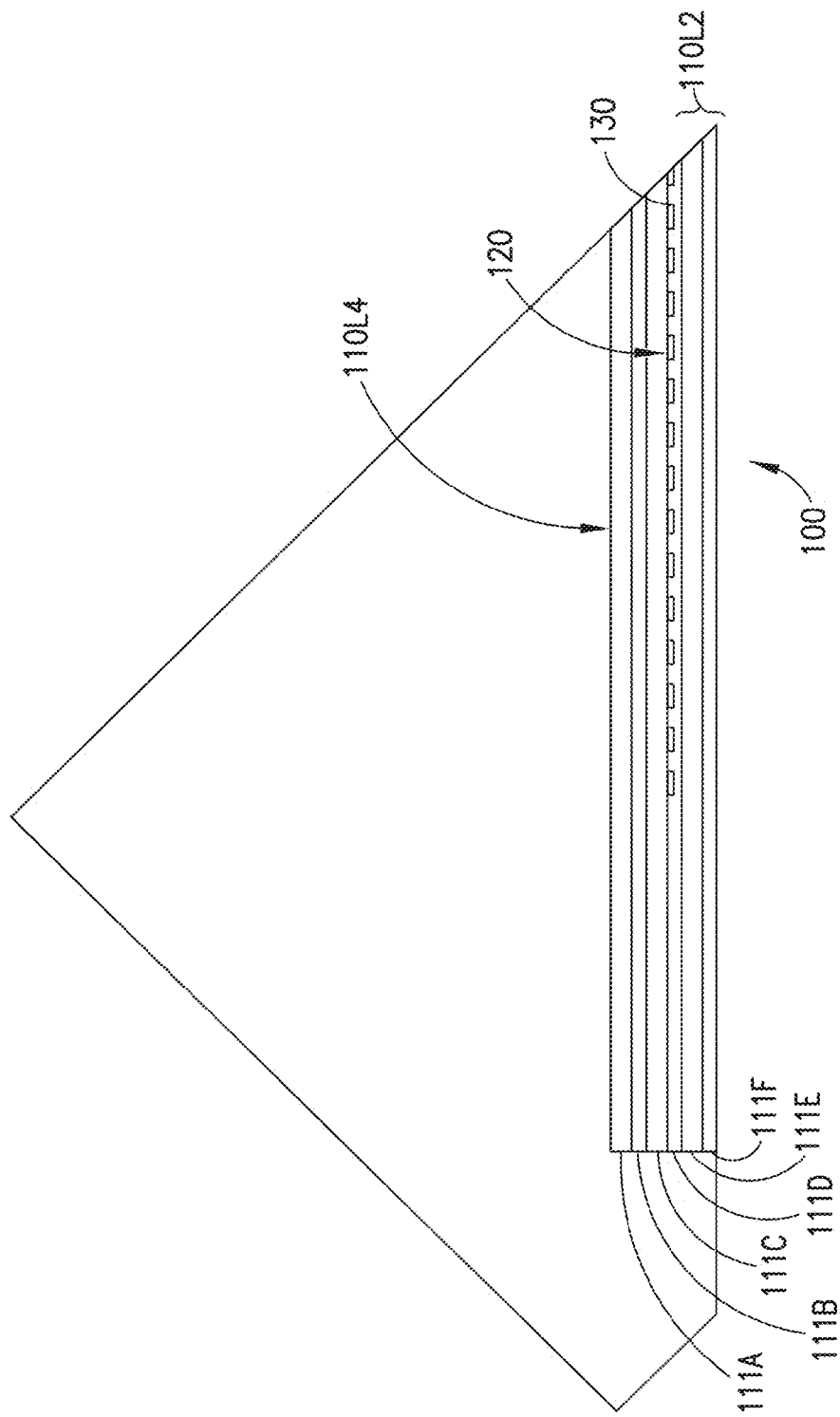
Figure 9B:
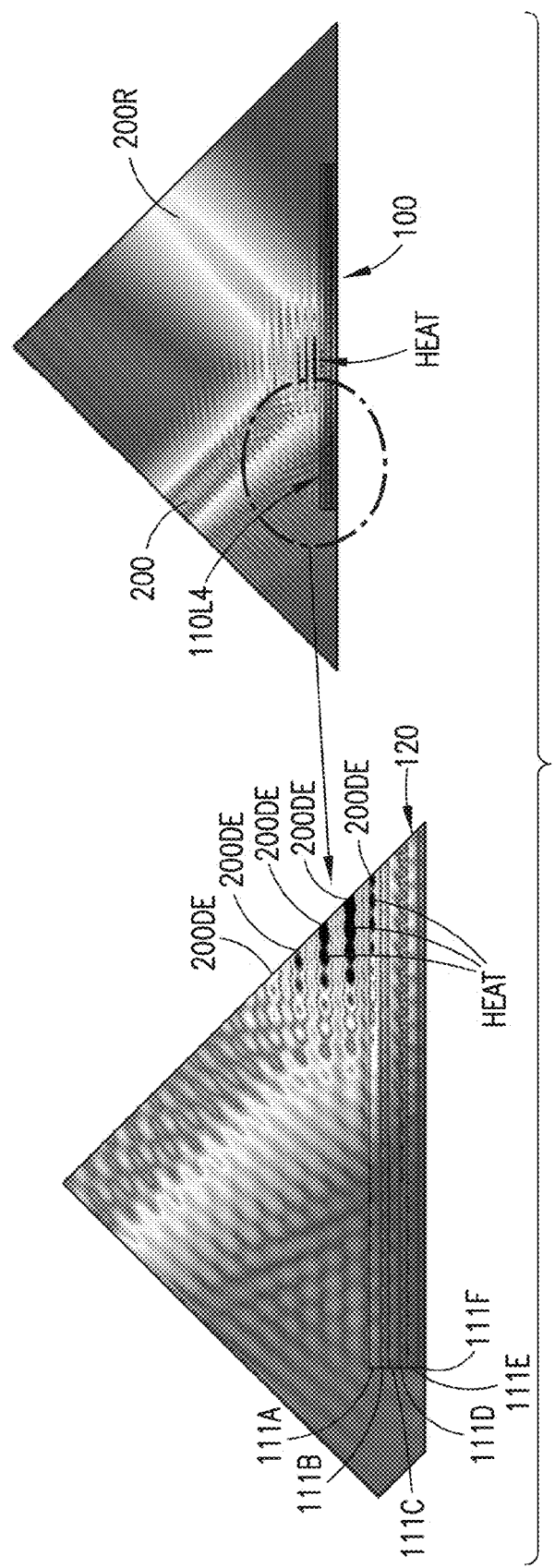
Figure 10:
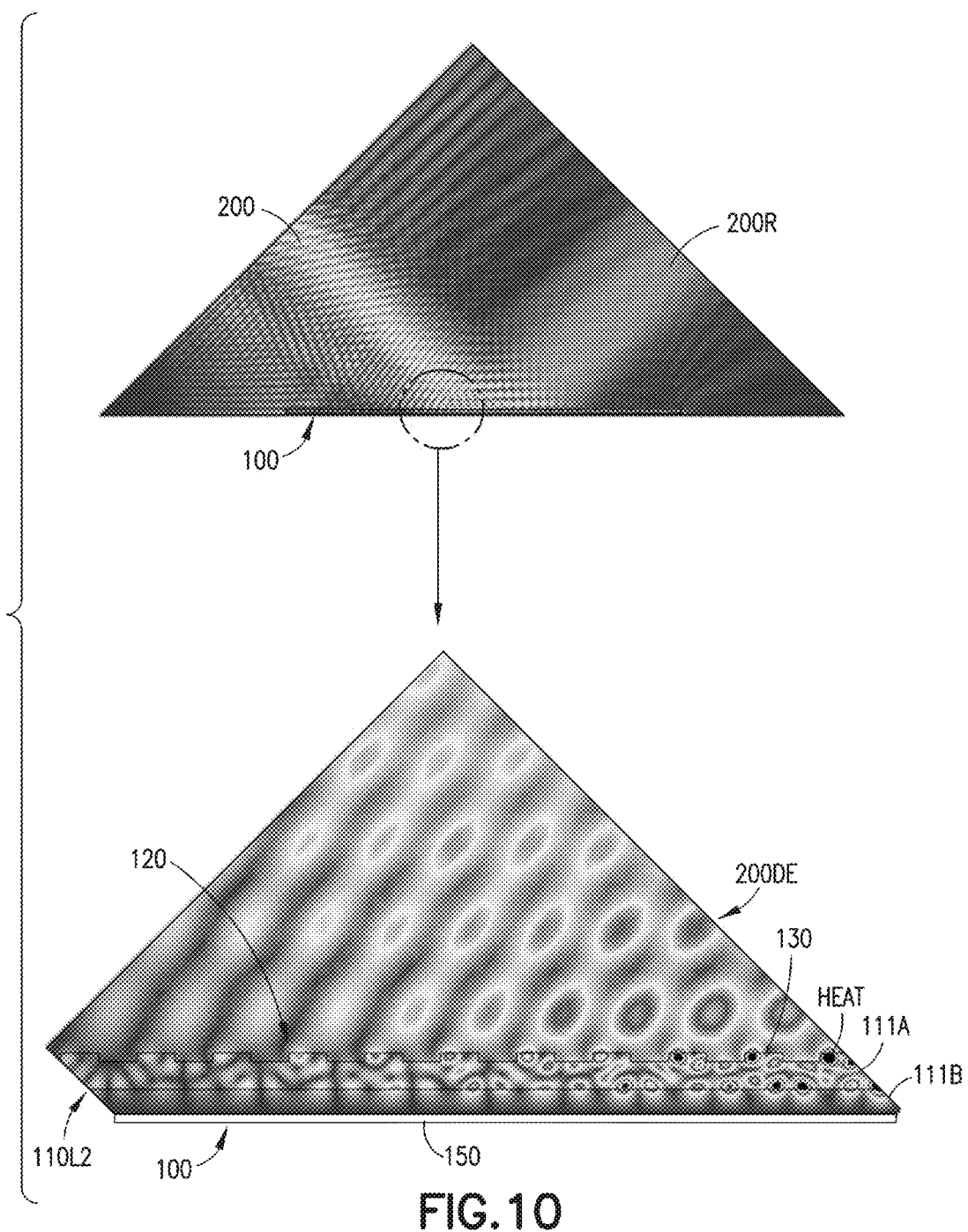

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic block diagram of a protective material in accordance with aspects of the present disclosure;

FIGS. 1B-1G are schematic illustrations of partial top views of photonic crystal arrays in accordance with aspects of the present disclosure;

FIG. 2 is a schematic illustration of a portion of a protective material in accordance with aspects of the present disclosure;

FIG. 3 is a schematic illustration of a portion of a protective material in accordance with aspects of the present disclosure;

FIG. 4 is a schematic illustration of a protective material in accordance with aspects of the present disclosure;

FIG. 5A is a schematic illustration of the protective material of FIG. 4 in accordance with aspects of the present disclosure;

FIG. 5B is a schematic illustration of reflected and dispersed incident energy for the protective material illustrated in FIG. 5A in accordance with aspects of the present disclosure;

FIG. 6A is a schematic illustration of a protective material in accordance with aspects of the present disclosure;

FIG. 6B is a schematic illustration of reflected and dispersed incident energy for the protective material illustrated in FIG. 6A in accordance with aspects of the present disclosure;

FIG. 7A is a schematic illustration of a protective material in accordance with aspects of the present disclosure;

FIG. 7B is a schematic illustration of reflected and dispersed incident energy for the protective material illustrated in FIG. 7A in accordance with aspects of the present disclosure;

FIG. 8A is a schematic illustration of a protective material in accordance with aspects of the present disclosure;

FIG. 8B is a schematic illustration of reflected and dispersed incident energy for the protective material illustrated in FIG. 8A in accordance with aspects of the present disclosure;

FIG. 9A is a schematic illustration of a protective material in accordance with aspects of the present disclosure;

FIG. 9B is a schematic illustration of reflected and dispersed incident energy for the protective material illustrated in FIG. 9A in accordance with aspects of the present disclosure;

FIG. 10 is a schematic illustration of reflected and dispersed incident energy for the protective material in accordance with aspects of the present disclosure; and FIG. 11 is a flow diagram in accordance with aspects of the present disclosure.

DETAILED DESCRIPTION

Illustrative, non-exhaustive examples, which may or may not be claimed, of the subject matter according the present disclosure are provided below.

Referring to FIG. 1, in accordance with the aspects of the present disclosure a protective material 100 is provided. As will be described herein, the protective material 100 may be applied to a substrate 160 in any suitable manner to provide protection of the substrate 160 from incident energy, such as energy from a high energy laser. In one aspect the substrate 160 may be an aerospace vehicle 160A, a terrestrial vehicle 160B, a maritime vessel 160C, an appliqué 160D wearable clothing 160E (e.g. lab coats, glasses, jackets, pants, etc.). In one aspect, the protective material may be formed directly on the substrate 160 in any suitable manner such as by one or more of deposition, coating, etching, and additively forming the protective material 100 on the substrate. In other aspects, where the protective material 100 is formed on an appliqué 160D the appliqué 160D may be applied to one or more surfaces of aerospace vehicles, terrestrial vehicles, maritime vessels or to wearable clothing (e.g. such as lenses of glasses, protective body panels, etc.).

In one aspect, the protective material 100 provides protection of the substrate 160 through a combination of dispersion, reflection and destructive interference of incident energy. For example, the protective material 100 reflects and disperses (and scatters) the incident energy so that the incident energy is dispersed and dissipated over a larger area of the substrate and the substrate experiences little to no heating as a result of the incident energy. In one aspect, the protective material 100 includes a dielectric mirror 110 having at least one layer 111A-111n that causes destructive interference of the incident and reflected light (e.g. light that is reflected within the protective material 100). In one aspect, as will be described in greater detail herein, each layer of the dielectric mirror is configured to reflect at least a portion of incident energy of a predetermined wavelength $\lambda$. In one aspect, the protective material 100 also includes one or more arrays of dielectric scatterers, such as one or more photonic crystal arrays 120 that disperse the incident energy. As will be described in greater detail herein, the one or more arrays of dielectric scatterers include a photonic crystal array 120 of periodic structures 130A-130n disposed within the dielectric mirror 110 where the photonic crystal array 120 of periodic structures 130A-130n is configured to disperse non-reflected incident energy of the predetermined wavelength transmitted through the dielectric mirror 110 across the photonic crystal array 120 of periodic structures 130A-130n in a direction parallel to a plane P1 of the dielectric mirror 110. In one aspect, the periodic structures 130A-130n form a Bragg reflection grating.

Referring now to FIGS. 1A-3, the at least one photonic crystal array 120 is coupled in direct contact to at least one of the layers 111A-111n of the dielectric mirror 110. Each photonic crystal array 120 includes periodic structures 130A-n, such as photonic crystals, that are in one aspect, etched into at least one layer 111A-111n of the dielectric mirror 110 while in other aspects, the periodic structures 130A-n are additively formed or grown on at least one layer 111A-111n of the dielectric mirror 110. The periodic structures 130A-n may be spatially arranged relative to one another in any suitable manner, such as in rows 190A-190n and columns 191A-191n (e.g. when viewed in plan view from a top or bottom of the protective material 100) as illustrated in FIGS. 1B and 1D-1G. In other aspects, the periodic structures 130A-n may be arranged in a staggered configuration as illustrated in FIG. 1C so that the periodic structures are arranged in rows 190A-190n and offset columns 191A-191n. Each of the periodic structures 130A may also have any suitable shape configured to disperse and/or reflect the incident energy. For example, still referring to FIGS. 1A-1G the periodic structures may have a circular cross-section (FIGS. 1B and 1C), a rectangular cross-section (FIG. 1D), a triangular cross-section (FIG. 1E), a polygonal (in this case hexagonal, although other polygonal shapes are possible and anticipated) cross-section (FIG. 1F) and/or a conical shape or variable cross-section (FIG. 1G). While FIGS. 1B-1G illustrate the periodic structures 130A in each photonic crystal array 120 array as having a common cross-section/shape (e.g. circular in FIGS. 1B and 1C, rectangular in FIG. 1D, etc.) in other aspects, a single photonic crystal array 120 may have periodic structures of different shapes where, for example, a single photonic crystal array 120 may have a combination of circular, rectangular, triangular, polygonal and/or variable cross-section periodic structures 130A-n.

Referring to FIGS. 2 and 3 an exemplary protective material 100 is illustrated coupled to a substrate 160. In this aspect, the protective material includes dielectric mirror 110, photonic crystal array 120 and a metallic mirror 150 in contact with the dielectric mirror 110. Here the metallic mirror 150 is coupled to the substrate in any suitable manner such as by deposition, coating, adhesion, etc. The photonic crystal array 120 may be additively formed on the metallic mirror 150 or formed in a layer 111 of the dielectric mirror 110 (the layers 111 are not illustrated in FIG. 2 for clarity). As can be seen in FIGS. 2 and 3 the photonic crystal array 120 of periodic structures 130A-n is disposed between the metallic mirror 150 and an outermost surface 110S of the dielectric mirror 110. In one aspect, at least one layer 111A-111n of the dielectric mirror 110 forms a protective coating for the photonic crystal array 120 of periodic structures 130. In one aspect, the periodic structures 130A-n may be formed on or in the metallic mirror 150.

As can be seen in FIGS. 2, 3 and 4 each periodic structure 130 of the photonic crystal array 120 has an elongated body 140 having a longitudinal axis LA. The body 140 includes a base 140B at one longitudinal end of the body 140 and an end 140EA disposed opposite the base 140B at the other longitudinal end of the body 140. The periodic structure 130 is coupled to the metallic mirror 150 or a respective layer 111 at the base 140B. As can be seen in FIGS. 2 and 3, where incident energy 200, such as from a high energy laser, is directed towards the protective material 100 (and the substrate 160) at an angle of incidence θ, each layer 111A-111n of the dielectric mirror 110 reflects at least a portion of the incident energy as reflected incident energy 200RA. The refracted incident energy 200RF (e.g. the non-reflected incident energy) continues to travel through the dielectric mirror 110 to the photonic crystal array 120 where the periodic structures 130A at least disperse at least a portion of the refracted incident energy 200RF as dispersed refracted energy 200D. In one aspect, the periodic structures 130A-n may also reflect at least a portion of the refracted incident energy 200RF as reflected and refracted incident energy 200RP. In one aspect, the photonic crystal array 120 of periodic structures 130A-n forms a meta-material 800 (see FIGS. 8A and 8B) where the periodic structures 130A-n have a configuration and a distribution along a plane P1 of the dielectric mirror 110 (where the plane of the dielectric mirror 110 is defined by e.g. an interface surface of or between one or more layers of the dielectric mirror 110 or the outermost surface 110S of the dielectric mirror 110) so as to resonantly couple the refracted (e.g. non-reflected) incident energy 200RF and the reflected and refracted energy 200RP that is reflected by the photonic crystal array 120 of periodic structures 130A-n. In one aspect, the photonic crystal array 120 of periodic structures 130A-n include band gaps that effect a negative index of refraction at an interface 260 between the dielectric mirror 110 and the periodic structures 130A-n that disperses the refracted (e.g. non-reflected) incident energy 200RF within the photonic crystal array 120 of periodic structures 130A-n by internal reflection. In sonic aspects, at least a portion of the refracted incident energy 200RF passes through the photonic crystal array 120 and is reflected by the metallic mirror 150 as reflected and refracted energy 200RB.

The ends 140EA of the periodic structures 130A-n in FIG. 2 are illustrated as being substantially flat (e.g. in a direction substantially orthogonal to the longitudinal axis LA of the periodic structures 130A), however, in other aspects the ends of the periodic structures 130A-n may be shaped to accommodate or reflect incident energy 200 having any suitable angle of incidence θ such as between about −45° to about +45° relative to, for example, the longitudinal axis LA of the periodic structures 130A-n (or relative to a direction substantially orthogonal to a surface of the substrate 160 where the photonic crystal array 120 is located). For example, the ends of the periodic structures 130A-n in FIG. 3 are illustrated as tapered ends 140EB which accommodate or reflect incident energy 200 having a larger angle of incidence θ than the substantially flat ends 140EA. In other aspects, the periodic structures have nay any suitable shape to reflect incident energy 200 having an angle of incidence less than about −45° and greater than about +45° relative to, for example, the longitudinal axis LA of the periodic structures 130A-n.

In one aspect, the dielectric mirror 110 includes at least one layer 111A-111n where each of the at least one layers 111A-111n has a respective thickness T1-Tn and a respective refractive index nA-nN as will be described in greater detail below. In one aspect, the at least one layer 111A-111n is a semi-transparent layer. Referring to FIGS. 4-5A, the protective material 100 includes a two layer dielectric mirror 110L2 having layers 111A, 111B. It is noted that in the figures the medium 500 in which the incident energy 200 is travelling is represented for illustration purposes as a triangular shape, which is merely representative of a region in which the protective material 100 is disposed. The medium 500 may be the Earth's atmosphere, a liquid, a vacuum (such as e.g. space) or any other suitable medium through which the incident energy 200 is capable of traveling.

Each layer 111A, 111B of the dielectric mirror 110 has a respective thickness T1, T2. In one aspect, the thickness T1, T2 is about one-quarter of the predetermined wavelength λ of the incident energy 200 and adjusted by the respective refractive index n of the respective layer 111A, 111B. For example, the thickness T of each layer 111 of the dielectric mirror can be expressed as $$T = \frac{\lambda_0 \cos\Theta}{4n} \quad [1]$$

where $\lambda_0$ is the wavelength of the incident energy in free space. In one aspect, each layer 111 of the dielectric mirror 110 has a thickness T that is an odd multiple (1, 3, 5, 7, . . . ) of about one-quarter of the predetermined wavelength λ adjusted by the respective refractive index n. In one aspect, the refractive index n of the layers 111 of the dielectric mirror 110 are such that the layers 111 arranged in a stack so as to have alternating high and low refractive indices n relative to adjacent layers in the stack. For example, in the two layer dielectric mirror 110L2, layer 111A (e.g. a first layer) has a first refractive index $n_1$ and the layer 111B (e.g. a second layer) has a second refractive index $n_2$ that is lower than the first refractive index $n_1$ of layer 111A. For exemplary purposes only, in one aspect, the layer 111A may be a magnesium fluoride ($MgF_2$) layer having an index of refraction of about 1.37 while the layer 111B may be a gallium arsenide (GaAs) layer having an index of refraction of about 3.8. In other aspects, the layers may be made of any suitable material including but not limited to silicon dioxide ($SiO_2$) and tantalum pentoxide ($Ta_2O_5$). The alternating high and low refractive indices n provide a dielectric mirror 110 having layers of alternating thicknesses. For example, the thickness T1 of layer 111A is greater than the thickness T2 of layer 111B. The alternating indices of refraction n also provide the dielectric mirror 110 with a reflectance R which can be expressed as $$R = \left[ \frac{n_0(n_2)^{2N} - n_s(n_1)^{2N}}{n_0(n_2)^{2N} + n_s(n_1)^{2N}} \right]^2 \quad [2]$$

where N is the number of layers in the dielectric mirror 110, $n_0$ is the refractive index of free space and $n_s$ is the refractive index of the substrate on which the dielectric mirror 110 is disposed (which as described herein may be the metallic mirror 150 or the substrate 160 if the metallic mirror 150 is not employed). While in the aspects described herein the layers 111 are chosen so that the dielectric mirror 110 has substantially two indices of refraction $n_1$ and $n_2$, in other aspects the dielectric mirror may have more than two indices of refraction.

In one aspect, the thickness T of each of the at least one layer 111 of the dielectric mirror 110 is such that the energy reflected (e.g. reflected incident energy 200RA and reflected and refracted energy 200RB) by each of the at least one layer 111 is in phase as illustrated in FIGS. 2 and 3.

As can be seen in FIG. 5B the two layer dielectric mirror 110L2 alone (e.g. without the photonic crystal array(s) 120 and metallic mirror 150) reflects about 25% of the incident energy 200 while dispersing at least a portion of the incident energy 200 (e.g. dispersed incident energy 200D) in a plane P1 of the dielectric mirror 110L2. The amount of incident energy reflected may be increased by adding additional layers 111 to the dielectric mirror. For example, referring now to FIGS. 6A and 6B a four layer dielectric mirror 110L4 is illustrated having layers 111A-111D. Each of the layers 111A-111D has a respective thickness T1-T4 and a respective index of refraction n so that the indices of refraction of the layers alternates (e.g. between indices $n_1$ and $n_2$) and hence, the thickness T of the layers also alternates (e.g. T1>T2<T3>T4) as illustrated in FIG. 6A. As can be seen in FIG. 6B, the four layer dielectric mirror 110L4 reflects about 80% of the incident energy as reflected incident energy 200R (which for the purposes of FIG. 5B includes one or more of, e.g., reflected incident energy 200RA and reflected and refracted energy 200RB) and disperses at least a portion of the incident energy as dispersed energy 200DE which includes dispersed refracted energy 200D in the plane P1 of the dielectric mirror 110L4.

Referring now to FIGS. 7A and 7B, an exemplary eight layer dielectric mirror 110L8 is illustrated having layers 111A-111H. Each of the layers 111A-111H has a respective thickness T1-T8 and a respective index of refraction n so that the indices of refraction of the layers alternates (e.g. between indices $n_1$ and $n_2$) and hence, the thickness T of the layers also alternates (e.g. T1>T2<T3>T4<T5>T6<T7>T8) as illustrated in FIG. 7A. As can be seen in FIG. 7B, the eight layer dielectric mirror 110L8 reflects about 100% of the incident energy as reflected incident energy 200R (which for the purposes of FIG. 7B includes one or more of, e.g., reflected incident energy 200RA and reflected and refracted energy 200RB) and disperses at least a portion of the incident energy as dispersed energy 200DE in the plane P1 of the dielectric mirror 110L8.

As can be seen in FIGS. 5B, 6B and 7B, while the dielectric mirror 110 alone may reflect up to about 100% of the incident energy 200, heat is generated by the incident energy 200 in the region the incident energy impinges on the dielectric mirror 110. This heat may be transferred to the substrate 160 to which the dielectric mirror 110 is affixed. In FIGS. 5B, 6B and 7B (as well as 8B, 9B and 10) it is noted that inside the protective material 100 (inclusive of the air around the protective material) the high energy field concentration from the incident energy 200 leads to Joules heating and eventually heat generation corresponding to the areas of high energy field concentration. In the energy field plots illustrated in. FIGS. 5B, 6B and 7B (as well as 8B, 9B and 10) it is the heat generated by the incident energy 200 that is illustrated as the incident energy 200 interacts with the protective material 100 of the present disclosure. To reduce or substantially eliminate the amount of heat transferred to the substrate 160 one or more photonic crystal array 120 may be provided in the dielectric mirror 110. For example, referring to FIGS. 8A and 8B, in one aspect, photonic crystal array 120 having periodic structures 130A-n may be provided on at least one layer 111A, 111B of the two layer dielectric mirror 110L2. In this aspect, the photonic crystal array 120 is provided on layer 111A but in other aspects, the photonic crystal array may be provided on layer 111B or both layers 111A and 111B. Here, in addition to the reflection of the incident energy 200, the photonic crystal array 120 provides dispersion (e.g. having a waveguide effect) of at least a portion of the incident energy 200 to the sides of the region the incident energy impinges on the dielectric mirror 110. In one aspect the dispersed energy 200DE is dispersed across the photonic crystal array 120 of periodic structures 130A-n in a plane PC of the photonic crystal array 120 (where the plane PC of the photonic crystal array 120 is a plane that spans across the photonic crystal array 120 that is substantially parallel with an interface surface of or between one or more layers of the dielectric mirror 110 or the outermost surface 110S of the dielectric mirror 110) which in one aspect is substantially the same as the plane P1 of the dielectric mirror 110L2. As can be seen by comparing FIGS. 5B and 8B, inclusion of the photonic crystal array 120 with the dielectric mirror 110 provides for greater dispersion of the incident energy 200 over a greater area than the dielectric mirror 110L2 alone.

Referring to FIGS. 9A and 9B a four layer dielectric mirror 110L4 is provided having layers 111A-111D. A photonic crystal array 120 is provided on layer 111D so that layers 111A-111C serve as a protective coating for the photonic crystal array 120. In addition, in this aspect, the dielectric mirror is disposed on a two layer dielectric mirror 110L2 having layers 111E, 111F. The four layer dielectric mirror 110L4 and two layer dielectric mirror 110L2 are similar to those described above. As can be seen in FIG. 9B the incident energy 200 is dispersed as described above with respect to FIGS. 8A and 8B while also providing greater amount of reflected incident energy 200R (which for the purposes of FIG. 9B includes one or more of, e.g., reflected incident energy 200RA and reflected and refracted energy 200RB) than the two layer dielectric mirror 110L2 having the photonic crystal array 120. In other aspects, additional layers 111 may be added to the dielectric mirror 110 in combination with the photonic crystal array 120 so that substantially 100% of the incident energy of the predetermined wavelength λ is reflected where the size and distribution of band gap features of the periodic structures 130 in the photonic crystal array 120 reflect and/or disperse substantially all of the incident energy of the predetermined wavelength λ transmitted into the photonic crystal array 120 (e.g. the refracted incident energy 200RF) from the dielectric mirror 110 in the manner described above with respect to e.g. FIGS. 2 and 3.

In one aspect, to maximize reflection, scattering and dispersion of the incident energy 200 the metallic mirror 150 may be provided so that the metallic mirror 150 is disposed behind the photonic crystal array 120 with respect to a direction of incident energy 200 (e.g., the incident energy passes through the photonic crystal array 120 before being reflected by the metallic mirror 150). Referring to FIG. 10 the protective material 100 is illustrated having a two layer dielectric mirror 110L2 with a photonic crystal array 120 disposed on layer 111A of the dielectric mirror. Here the dielectric mirror is disposed on the metallic mirror 150. As can be seen in FIG. 10 the incident energy 200 is reflected as reflected incident energy 200R (which for the purposes of FIG. 10 includes one or more of, e.g., reflected incident energy 200RA and reflected and refracted energy 200RB), is dispersed as dispersed incident energy 200DE and scattered such that substantially no heat is generated in the region the incident energy impinges on the dielectric mirror 110. In other aspects, to further reduce the amount of heat in the region the incident energy impinges on the dielectric mirror 110 additional layers may be added to the dielectric mirror 110 as described above.

Referring to FIGS. 1, 2, 3 and 11, in operation, the protective material 100 reflects and disperses incident energy of a predetermined wavelength. As described above, the protective material 100 is applied to the substrate 160 to be protected (FIG. 11, Block 1100). The dielectric mirror 110 having at least one layer 111 reflects at least a portion of incident energy 200 of a predetermined wavelength λ (FIG. 11, Block 1110), where each layer 111 of the dielectric mirror 110 reflects a portion of the incident energy of the predetermined wavelength λ. In one aspect, non-reflected incident energy (e.g. the refracted incident energy 200RF) of the predetermined wavelength λ transmitted through the dielectric mirror 110 is dispersed with the photonic crystal array 120 of periodic structures 130 disposed within the dielectric mirror 110, across the photonic crystal array 120 of periodic structures 130A-130n in a direction parallel to a plane P1 of the dielectric mirror (FIG. 11, Block 1115). In one aspect, non-reflected incident energy (e.g. refracted incident energy 200RF) of the predetermined wavelength λ transmitted through the dielectric mirror 110 is reflected with the photonic crystal array 120 of periodic structures 130A-n disposed within the dielectric mirror 110, across the photonic crystal array 120 of periodic structures 130A-n in a direction parallel to a plane P1 of the dielectric mirror (FIG. 11, Block 1120). In one aspect the incident energy 200 may be reflected in phase with each of the at least one layer 111 where the thickness of each layer 111 causes the in phase reflection of the incident energy 200. In one aspect, the photonic crystal array 120 of periodic structures 130A-n may resonantly couple the non-reflected incident energy (e.g. the refracted incident energy 200RF) and reflected and refracted energy 200RP by the photonic crystal array of periodic structures. In one aspect, at least a portion of the non-reflected incident energy (e.g. the refracted incident energy 200RF) may be reflected with a tapered end 140EB of each of the periodic structures 130A-n. In one aspect, the non-reflected incident energy (e.g. the refracted incident energy 200RF) may be dispersed within the photonic crystal array 120 of periodic structures 130A-n by internal reflection. In one aspect, at least a portion of the non-reflected incident energy (e.g. the refracted incident energy 200RF) may be reflected with the metallic mirror 150 as described above.

The following are provided in accordance with the aspects of the present disclosure:

A. A protective material comprising:
a dielectric mirror having at least one layer, each layer of the dielectric mirror being configured to reflect at least a portion of incident energy of a predetermined wavelength; and
a photonic crystal array of periodic structures disposed within the dielectric mirror, the photonic crystal array of periodic structures being configured to disperse non-reflected incident energy of the predetermined wavelength transmitted through the dielectric mirror across the photonic crystal array of periodic structures in a direction parallel to a plane of the dielectric mirror.

A1. The protective material of paragraph A, wherein the dielectric mirror includes a first layer having a first refractive index and a second layer having a second refractive index that is lower than the first refractive index of the first layer.

A2. The protective material of paragraph A, wherein each layer of the dielectric mirror has a thickness that is about one-quarter of the predetermined wavelength and adjusted by the respective refractive index.

A3. The protective material of paragraph A2, wherein a thickness of each of the at least one layer is such that the incident energy reflected by each of the at least one layer is in phase.

A4. The protective material of paragraph A, wherein each layer of the dielectric mirror has a thickness that is an odd multiple of about one-quarter of the predetermined wavelength adjusted by the respective refractive index.

A5. The protective material of paragraph A4, wherein a thick mess of each of the at least one layer is such that the incident energy reflected by each of the at least one layer is in phase.

A6. The protective material of paragraph A, wherein the photonic crystal array of periodic structures forms a metamaterial where the periodic structures have a configuration and a distribution along the plane of the dielectric mirror so as to resonantly couple the non-reflected incident energy and energy reflected by the photonic crystal array of periodic structures.

A7. The protective material of paragraph A, wherein each of the periodic structures includes a body having base in contact with a respective layer of the dielectric mirror and a tapered end opposite the base, the tapered end being configured to reflect at least a portion of the non-reflected incident energy.

A8. The protective material of paragraph A, wherein the photonic crystal array of periodic structures include band gaps that effect a negative index of refraction at an interface between the dielectric mirror and the periodic structures that disperses the non-reflected incident energy within the photonic crystal array of periodic structures by internal reflection.

A9. The protective material of paragraph A, further comprising a metallic mirror in contact with the dielectric mirror, where the dielectric mirror includes an outermost surface and the photonic crystal array of periodic structures is disposed within the dielectric mirror between outermost surface and the metallic mirror.

A10. The protective material of paragraph A, wherein at least a portion of the dielectric mirror forms a protective coating for the photonic crystal array of periodic structures.

A11. The protective material of paragraph A, further comprising a substrate coupled to the dielectric mirror.

A12. The protective material of paragraph A11, wherein the substrate is an appliqué.

A13. The protective material of paragraph A11, wherein the substrate is a portion of an aerospace vehicle, a terrestrial ground vehicle or a maritime vessel.

A14. The protective material of paragraph A11, wherein the substrate is an article of wearable clothing.

A15. The protective material of paragraph Al1, wherein the dielectric mirror is deposited as a coating on the substrate.

A16. The protective material of paragraph A, wherein the photonic crystal array of periodic structures is etched into one layer of the dielectric mirror.

A17. The protective material of paragraph A, wherein the photonic crystal array of periodic structures is additively formed on one layer of the dielectric mirror.

A18. The protective material of paragraph A, wherein the at least one layer of the dielectric mirror are arranged in a stack so as to have alternating high and low refractive indices relative to adjacent layers in the stack.

A19. The protective material of paragraph A, wherein the photonic crystal array of periodic structures forms a Bragg grating.

B. A protective material comprising:
a metallic mirror;
a dielectric mirror formed on the metallic mirror and having at least one layer, each layer of the dielectric mirror being configured to reflect at least a portion of incident energy of a predetermined wavelength; and
a photonic crystal array of periodic structures disposed within the dielectric mirror, the photonic crystal array of periodic structures being configured to disperse non-reflected incident energy of the predetermined wavelength transmitted through the dielectric mirror across the photonic crystal array of periodic structures in a direction parallel to a plane of the dielectric mirror.

B1. The protective material of paragraph B, wherein the dielectric mirror includes a first layer having a first refractive index and a second layer having a second refractive index that is lower than the first refractive index of the first layer.

B2. The protective material of paragraph B, wherein each layer of the dielectric mirror has a thickness that is about one-quarter of the predetermined wavelength and adjusted by the respective refractive index.

B3. The protective material of paragraph B2, wherein a thickness of each of the at least one layer is such that the incident energy reflected by each of the at least one layer is in phase.

B4. The protective material of paragraph B, wherein each layer of the dielectric mirror has a thickness that is an odd multiple of about one-quarter of the predetermined wavelength adjusted by the respective refractive index.

B5. The protective material of paragraph B4, wherein a thickness of each of the at least one layer is such that the incident energy reflected by each of the at least one layer is in phase.

B6. The protective material of paragraph B, wherein the photonic crystal array of periodic structures forms a metamaterial where the periodic structures have a configuration and a distribution along the plane of the dielectric mirror so as to resonantly couple the non-reflected incident energy and energy reflected by the photonic crystal array of periodic structures.

B7. The protective material of paragraph B, wherein each of the periodic structures includes a body having base in contact with a respective layer of the dielectric mirror and a tapered end opposite the base, the tapered end being configured to reflect at least a portion of the non-reflected incident energy.

B8. The protective material of paragraph B, wherein the photonic crystal array of periodic structures include band gaps that effect a negative index of refraction at an interface between the dielectric mirror and the periodic structures that disperses the non-reflected incident energy within the photonic crystal array of periodic structures by internal reflection.

B9. The protective material of paragraph B, wherein at least a portion of the dielectric mirror forms a protective coating for the photonic crystal array of periodic structures.

B10. The protective material of paragraph B, further comprising a substrate coupled to the dielectric mirror.

B11. The protective material of paragraph B10, wherein the substrate is an appliqué.

B12. The protective material of paragraph B10, wherein the substrate is a portion of an aerospace vehicle, a terrestrial ground vehicle or a maritime vessel.

B13. The protective material of paragraph B 10, wherein the substrate is an article of wearable clothing.

B14. The protective material of paragraph B10, wherein the metallic mirror is deposited as a coating on the substrate.

B15. The protective material of paragraph B, wherein the photonic crystal array of periodic structures is etched into one layer of the dielectric mirror.

B16. The protective material of paragraph B, wherein the photonic crystal array of periodic structures is additively formed on one layer of the dielectric mirror.

B17. The protective material of paragraph B, wherein the at least one layer of the dielectric mirror are arranged in a stack so as to have alternating high and low refractive indices relative to adjacent layers in the stack.

B18. The protective material of paragraph B, wherein the photonic crystal array of periodic structures forms a Bragg grating.

C. A method for reflecting and dispersing incident energy of a predetermined wavelength, the method comprising:

reflecting at least a portion of incident energy of a predetermined wavelength with a dielectric mirror having at least one layer, each layer of the dielectric mirror reflecting a portion of the incident energy of the predetermined wavelength; and dispersing non-reflected incident energy of the predetermined wavelength transmitted through the dielectric mirror, with a photonic crystal array of periodic structures disposed within the dielectric mirror, across the photonic crystal array of periodic structures in a direction parallel to a plane of the dielectric mirror.

C1. The method of paragraph C, further comprising reflecting the incident energy in phase with each of the at least one layer.

C2. The method of paragraph C, further comprising the resonantly coupling the non-reflected incident energy and energy reflected by the photonic crystal array of periodic structures.

C3. The method of paragraph C, further comprising reflecting at least a portion of the iron-reflected incident energy with a tapered end of each of the periodic structures.

C4. The method of paragraph C, further comprising dispersing the non-reflected incident energy within the photonic crystal array of periodic structures by internal reflection.

C5. The method of paragraph C, further comprising reflecting at least a portion of the non-reflected incident energy with a metallic mirror In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are riot explicitly illustrated herein. Similarly, additional features not limited to the examples presented, may be combined with some or all of the features shown and described herein.

In FIG. 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices author processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A protective material comprising:
   a dielectric mirror having at least one layer, each layer of the dielectric mirror being configured to reflect at least a portion of incident energy of a predetermined wavelength; and
   a photonic crystal array of disconnected periodic structures disposed within the dielectric mirror, the photonic crystal array of disconnected periodic structures being configured to disperse non-reflected incident energy of the predetermined wavelength transmitted through the dielectric mirror across the photonic crystal array of disconnected periodic structures in a direction parallel to a plane of the dielectric mirror.

2. The protective material of claim 1, wherein the dielectric mirror includes a first layer having a first refractive index and a second layer having a second refractive index that is lower than the first refractive index of the first layer.

3. The protective material of claim 1, wherein each layer of the dielectric mirror has a thickness that is about one-quarter of the predetermined wavelength and adjusted by the respective refractive index.

4. The protective material of claim 1, wherein the photonic crystal array of periodic structures forms a metamaterial where the periodic structures have a configuration and a distribution along the plane of the dielectric mirror so as to resonantly couple the non-reflected incident energy and energy reflected by the photonic crystal array of periodic structures.

5. The protective material of claim 1, wherein each of the periodic structures includes a body having base in contact with a respective layer of the dielectric mirror and a tapered end opposite the base, the tapered end being configured to reflect at least a portion of the non-reflected incident energy.

6. The protective material of claim 1, wherein the photonic crystal array of periodic structures include band gaps that effect a negative index of refraction at an interface between the dielectric mirror and the periodic structures that disperses the non-reflected incident energy within the photonic crystal array of periodic structures by internal reflection.

7. The protective material of claim 1, further comprising a metallic mirror in contact with the dielectric mirror, where the dielectric mirror includes an outermost surface and the photonic crystal array of periodic structures is disposed within the dielectric mirror between outermost surface and the metallic mirror.

8. The protective material of claim 1, wherein at least a portion of the dielectric mirror forms a protective coating for the photonic crystal array of periodic structures.

9. The protective material of claim 1, further comprising a substrate coupled to the dielectric mirror.

10. The protective material of claim 1, wherein the at least one layer of the dielectric mirror are arranged in a stack so as to have alternating high and low refractive indices relative to adjacent layers in the stack.

11. A protective material comprising:
    a metallic mirror;
    a dielectric mirror formed on the metallic mirror and having at least one layer, each layer of the dielectric mirror being configured to reflect at least a portion of incident energy of a predetermined wavelength; and
    a photonic crystal array of disconnected periodic structures disposed within the dielectric mirror, the photonic crystal array of disconnected periodic structures being configured to disperse non-reflected incident energy of the predetermined wavelength transmitted through the dielectric mirror across the photonic crystal array of disconnected periodic structures in a direction parallel to a plane of the dielectric mirror.

12. The protective material of claim 11, wherein the dielectric mirror includes a first layer having a first refractive index and a second layer having a second refractive index that is lower than the first refractive index of the first layer.

13. The protective material of claim 11, wherein each layer of the dielectric mirror has a thickness that is about one-quarter of the predetermined wavelength and adjusted by the respective refractive index.

14. The protective material of claim 11, wherein the photonic crystal array of periodic structures include band gaps that effect a negative index of refraction at an interface between the dielectric mirror and the periodic structures that disperses the non-reflected incident energy within the photonic crystal array of periodic structures by internal reflection.

15. A method for reflecting and dispersing incident energy of a predetermined wavelength, the method comprising:
   reflecting at least a portion of incident energy of a predetermined wavelength with a dielectric mirror having at least one layer, each layer of the dielectric mirror reflecting a portion of the incident energy of the predetermined wavelength; and
   dispersing non-reflected incident energy of the predetermined wavelength transmitted through the dielectric mirror, with a photonic crystal array of disconnected periodic structures disposed within the dielectric mirror, across the photonic crystal array of disconnected periodic structures in a direction parallel to a plane of the dielectric mirror.

16. The method of claim 15, further comprising reflecting the incident energy in phase with each of the at least one layer.

17. The method of claim 15, further comprising resonantly coupling the non-reflected incident energy and energy reflected by the photonic crystal array of periodic structures.

18. The method of claim 15, further comprising reflecting at least a portion of the non-reflected incident energy with a tapered end of each of the periodic structures.

19. The method of claim 15, further comprising dispersing the non-reflected incident energy within the photonic crystal array of periodic structures by internal reflection.

20. The method of claim 15, further comprising reflecting at least a portion of the non-reflected incident energy with a metallic mirror.

* * * * *